United States Patent
Ulrich

(12) 
(10) Patent No.: US 6,189,257 B1
(45) Date of Patent: Feb. 20, 2001

(54) ARRAY OF CLUSTERED FISHHOOKS REMAINING TANGLE FREE IN USE AND IN STORAGE

(76) Inventor: Donald E. Ulrich, 1840 Cape Cod Cove, Grand Island, FL (US) 32735

(*) Notice: Under 35 U.S.C. 154(b), the term of this patent shall be extended for 0 days.

(21) Appl. No.: 09/434,918

(22) Filed: Nov. 5, 1999

(51) Int. Cl.$^7$ ................................................. A01K 83/00
(52) U.S. Cl. ........................................ 43/43.16; 43/44.82
(58) Field of Search ............................... 43/43.16, 44.82, 43/44.2, 44.4, 44.8

(56) References Cited

U.S. PATENT DOCUMENTS

| | | | |
|---|---|---|---|
| 831,552 | * 9/1906 | Hallstrom | 43/44.82 |
| 2,242,708 | * 5/1941 | Lancaster | 43/44.8 |
| 2,266,725 | * 12/1941 | Andrews | 43/44.8 |
| 2,592,664 | * 4/1952 | DeMello | 43/44.82 |
| 2,640,291 | * 6/1953 | Garner | 43/37 |
| 2,700,242 | 1/1955 | Porth . | |
| 2,787,858 | * 4/1957 | Best | 43/44.8 |
| 2,823,486 | * 2/1958 | Behee | 43/43.16 |
| 2,908,990 | * 10/1959 | Rimbach | 43/44.82 |
| 3,130,514 | * 4/1964 | Cornick | 43/43.16 |
| 3,778,921 | * 12/1973 | Peterson | 43/44.8 |
| 4,232,470 | * 11/1980 | Steffick | 43/43.16 |
| 4,750,291 | 6/1988 | Chilton . | |
| 4,785,571 | * 11/1988 | Beck | 43/44.4 |
| 5,083,394 | * 1/1992 | Harwig | 43/43.16 |
| 5,373,658 | * 12/1994 | Huppert | 43/43.16 |
| 5,664,364 | 9/1997 | Clark . | |

* cited by examiner

*Primary Examiner*—Kurt Rowan
(74) *Attorney, Agent, or Firm*—Julian C. Renfro, Esq.

(57) ABSTRACT

A fishhook adapted to be used in a clustered arrangement, with each hook of the cluster mounted for pivotal movement so as to be able to minify the chance of entanglement with weeds or trash. The novel fishhook array made possible in accordance with this invention also enables a highly advantageous weathervaning characteristics of each individually attached hook/lure entity, such that each is maintained in a natural horizontal attitude. Each hook has an upper shank portion extending at an angle downwardly from the eye of the hook, with the upper shank portion forming a forwardly curved shoulder portion with the integral lure-receiving lower shank portion. This curved forward shoulder portion forms an acute angle, such that the lower shank portion is able to reside in a generally horizontal position when the hook is suspended from the eye. The end of the lower shank portion remote from the shoulder portion has an upturned portion terminating in a point intended to protrude from a rear location of a lure inserted upon the lower shank portion. In accordance with this invention, a relatively small loop is formed in the lower shank portion, with this loop having a relatively narrow entrance portion, through which the eye of a like hook can be passed. The placement of this novel loop makes it readily possible for a like hook to be suspended below the lower shank portion, thus to enable the clustering of two or more hooks in a substantially vertically disposed array.

5 Claims, 2 Drawing Sheets

ARRAY OF CLUSTERED FISHHOOKS REMAINING TANGLE FREE IN USE AND IN STORAGE

CROSS-REFERENCE TO RELATED APPLICATION

This application bears a definite relationship to my co-pending application, now allowed, entitled "WEEDLESS HOOK AND LURE HAVING LURE INTERCHANGABILITY," Ser. No. 09/211,488, filed Dec. 15, 1998 now U.S. Pat. No. 6,006,467.

BACKGROUND OF THE INVENTION

To increase the chance of catching a large number of fish or other seafood, fisherman sometimes attach multiple hooks onto a single line. The use of multiple hooks has largely been restricted to bait fishing (still fishing) and often required tying several individual hooks to a fishline. Such hooks were in many instances initially tied to short leads, with such leads then being tied to the fishline. Such an arrangement was cumbersome and time consuming.

In sport fishing (cast & retrieve) the use of multiple hooks has largely been neglected inasmuch as in the past, no practical arrangement existed for permitting the fisherman to secure multiple lures to the fishline in an arrangement that prevents such multiple lures from becoming entangled with one another or with weeds and obstructions.

One of the more common ways of connecting one hook to another hook in accordance with the teachings of the prior art involved the use of a rubber tube or a coil spring that is wrapped about the hooks, such as in the manner illustrated in U.S. Pat. Nos. 2,700,242 and 3,082,563. However, the use of an additional element such as the rubber tube or coil spring for connection has proven to be undesirable in that the tube or spring is difficult to apply and contributes to undesirable clutter and inconvenience. Connectors of this type also have the deficiency of allowing the hook or hooks to move relative to each other in a twisting or sliding motion, as well as the deficiency of permitting one or more of the hooks to get easily snagged or hung up on branches or the like while in the water.

Connectors that do not require additional elements to connect one hook to another include, for example, those illustrated in French Patent No. 1,085,713 to Barreras, which relies on a permanent connection between a leading hook and a trailer hook. A permanent connection has proved to be too restrictive in that there are many situations where it is desirable to remove the trailer hook from the leading hook. For example, a fisherman using a trailer hook system may get a catch on the trailer hook and instead of removing the hook from the catch, will want to detach the trailer hook from the leading hook. By keeping the hook in the catch, it is easier to connect the catch to a fish stringer or the like.

The Porth U.S. Pat. No. 2,700,242 entitled "BAIT HARNESS" shows a multiple hook array, but such an arrangement is complicated and expensive, and is not functional for the purposes of the instant invention.

The Chilton U.S. Pat. No. 4,750,291 entitled "TRAILER HOOK SYSTEM" shows a multiple hook arrangement in which the eye of one hook, identified as the trailer hook, engages the curved portion of the leading hook, with this arrangement preventing undue twisting and sliding of the hooks relative to one another. However, the Chilton arrangement makes no provision for the lures placed on such hooks to reside in a horizontally disposed, essentially lifelike attitude.

The Clark U.S. Pat. No. 5,664,364 entitled "FISHHOOK" reveals a fishhook with what is described as a "return bend" portion designed to resist the sliding of gelatinous lures along the shank of the hook, but the Clark patent teaches nothing regarding the use of multiple hooks clustered in a tangle-free arrangement.

It was in an effort to provide a distinct improvement over these prior art devices that the present arrangement was evolved.

SUMMARY OF THE INVENTION

In accordance with this invention I have provided a novel fishhook adapted to be used in a hook array, with each fishhook of the array being individually mounted for pivotal movement with respect to the hook disposed thereabove, with this arrangement being such as to minify the chance of entanglement with weeds or trash. My novel hook bears a relationship to the basic fishhook forming the subject of the now-allowed patent application Ser. No. 09/211,488 entitled "WEEDLESS HOOK AND LURE HAVING LURE INTERCHANGABILITY" in that the instant hook is of generally triangular configuration, having an eye from which the hook is to be supported. Both the earlier hook design as well as the instant hook design involve a substantially straight upper shank portion commencing at the eye of the hook and extending at an angle downwardly and forwardly from the eye, as well as an integral lower, lure-receiving shank portion adapted to receive a lure intended to reside in a generally horizontally disposed attitude. The upper and lower shank portions meet in a curved forward shoulder portion of small radius so as to form an acute angle, such that the lower shank portion is able to reside in the desired generally horizontal position when the hook is suspended from the eye and a lure has been inserted upon such lower shank portion with the head of the lure residing close to the curved forward shoulder portion.

The end of the lower shank of each hook remote from the curved forward shoulder portion has a curved, upturned portion terminating in a point. Typically a barb is utilized adjacent the point of the upturned portion, with such point being directed toward and in substantial alignment with the eye. The point on this upturned portion is intended to protrude from a rear location of a lure inserted onto the lower shank.

Despite the distinct similarities between the basic hook forming the subject of my already-allowed patent application and the instant hook, it is important to understand that the instant hook differs quite significantly from the earlier hook. The distinctive portion of the instant hook involves the utilization of a relatively small loop formed in the lower shank portion of the hook, which loop is adapted to closely receive the eye of a like hook that is to be suspended below the lower shank portion. This loop or open ended eye is generally circular and preferably disposed in a plane that includes the upper and lower shank portions. To be noted is the fact that the relatively small, preformed loop is located in a forward part of the lower shank portion, being disposed closer to the curved forward shoulder portion of the hook than to the upturned portion that terminates in the point. Because of this forward placement of the generally circular loop on the lower shank, each lower hook of the vertically clustered array is caused to be located slightly forward of the hook from which it is suspended.

With regard to both the earlier hook as well as the instant hook, it is to be noted that the radius of curvature of the upturned portion adjacent the point is preferably closely similar to the radius of curvature of the curved forward shoulder portion, and the angle at the forward shoulder portion between the upper and the lower shank portions is in the range of 40° to 70°.

With further regard to the instant hook designed for use in a clustered array, in the preferred instance a plurality of these novel fishhooks is adapted to be used such that each fishhook of the array is individually mounted for pivotal movement with respect to the hook thereabove, thus to be able to avoid entanglement with weeds or trash. Each of the hooks is of generally triangular configuration and has an eye from which the hook may be supported, with each hook further having a substantially straight upper shank portion and a lower, lure-receiving shank portion integral with the upper shank portion, with the upper and lower shank portions of each hook meeting in a curved forward shoulder portion of small radius so as to form an acute angle, such that the lower shank portion is able to reside in a generally horizontal position when the hook is suspended from the eye and a lure has been inserted upon the lower shank portion. Because of the relatively small, generally circular loop formed in the lower shank portion of each hook, it may readily receive the eye of a like hook to be suspended below the lower shank portion. The relatively small, generally circular loop of each hook is preferably disposed in a plane that includes the upper and lower shank portions.

It is to be noted that the effective support location for each hook is located forward of the center of the lower shank portion. Because of this, after a lure has been inserted on the lower shank portion of each hook of the array, with the head of the lure pointing forwardly, each lure of the array will tend to face forwardly when retrieved, and into a slight current when motionlessly suspended, while at the same time the body of the lure remains in a realistic, generally horizontally disposed attitude.

The open ended eye or preformed loop I utilize on the lower shank of each hook is preferably sized to permit each suspended hook to have free lateral movement of approximately 40° left and 40° right with respect to the supporting hook. I prefer to refer to this as "weathervaning," which means that one hook of the substantially vertical array of hooks can readily move to a different orientation than other hooks of the array.

It is a principal object of this invention to provide a multiple hook arrangement that is quick and convenient, and requires the attachment of only one hook to the fishline, with other hooks to be used in the hook arrangement being readily snapped into place so as to define a highly effective, downwardly descending array.

It is another object of this invention to provide a novel hook having upper and lower shank portions meeting in a curved, forwardly extended shoulder portion wherein the lower shank portion has an open ended eye or preformed loop that is relatively small, which loop is sized to closely receive the eye of a hook to be suspended directly below, thus enabling a substantially vertical array of lure-receiving hooks to be readily achieved.

It is yet another object of this invention to provide a novel multiple hook arrangement that keeps each of the hooks of the array as well as their respective lures in a natural horizontally disposed, lifelike attitude at all times, whether pursuing sport fishing, or indulging in what is sometimes referred to as still fishing.

It is yet still another object of this invention to provide a multiple hook arrangement that is tangle free in use and storage, with this novel arrangement possessing the additional advantage of enabling hooks to be added to or removed from the array without the necessity of having to cut and retie the fishline.

It is yet still another object of this invention to provide a multiple hook arrangement that conveys the appearance of lures or minnows swimming in unison, thereby increasing the likelihood of a strike.

It is a further object of this invention to provide an arrangement for attaching multiple hooks in a substantially vertically disposed array wherein each hook is permitted a considerable amount of free lateral movement, one from another, thereby avoiding any appearance of unnatural rigidness, with the extent of this free lateral movement typically being in the region of 40° to the left and 40° to the right with respect to the hook located thereabove.

It is a still further object of my invention to provide a novel multiple hook arrangement wherein the lures mounted on the hooks are suspended in a common, forwardly angled relationship rather than a precisely aligned vertical array.

It is a yet still further object of my invention to provide a novel multiple hook arrangement serving to keep the lures facing in the same general direction at all times, this being accomplished as a result of the novel weathervane characteristics of the hook/lure combination.

These and other objects, features and advantages will become more apparent as the description proceeds.

DETAILED DESCRIPTION

Figure 1:
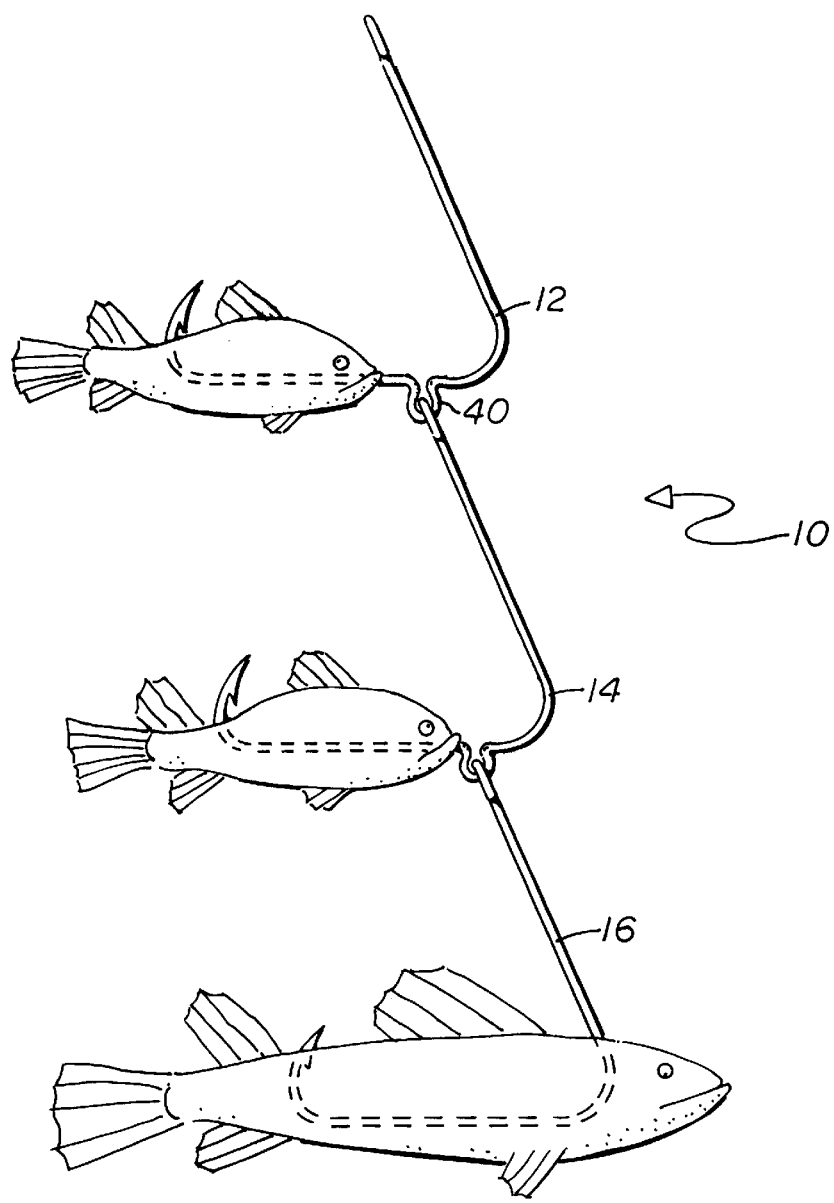
FIG. 1 is a view of my novel multiple hook arrangement wherein the lures residing on the hooks are disposed in a horizontal position in a very lifelike attitude, with each hook/lure of the array being able to "weathervane" independently with respect to the other hooks of the array.

With initial reference to FIG. 1, it will be noted that I have shown how in accordance with this invention, a plurality of fishhooks is adapted to be clustered in a hook array 10. In this instance I have depicted fishhooks 12, 14, and 16, with each fishhook of the array being individually mounted for pivotal movement so as to be able to minimize the chance of entanglement with other hooks as well as with weeds or debris. Furthermore, it is to be noted that each hook of the hook array is permitted a substantial amount of free lateral movement, one from another, thereby avoiding any appearance of unnatural rigidity.

From FIG. 1 it will be observed that suspended from a downwardly directed loop located on the lower shank of the uppermost hook 12 of the array 10 is a hook 14, with lowermost hook 16 being supported from the hook 14. The hook 12 is typical of other hooks of the array in that its lower shank is specifically configured to support a hook therebelow, with it to be noted that the hook 12 as well as the other hooks of the array are of generally triangular configuration.

Figure 2:
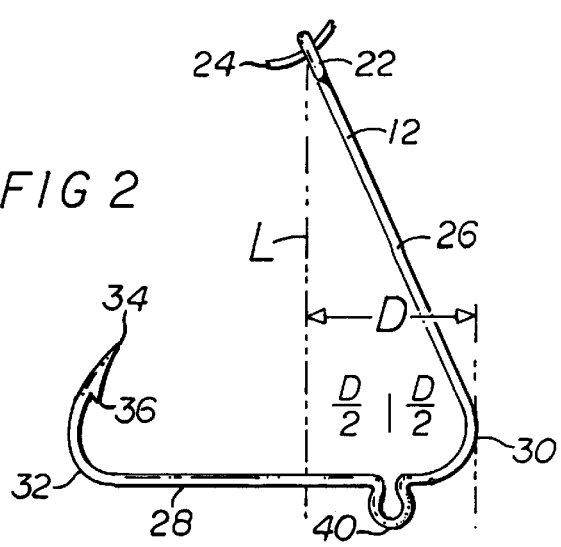
FIG. 2 is a somewhat enlarged view of one of the hooks of the array depicted in FIG. 1, with this view illustrating the novel, downwardly directed loop or open ended eye disposed in the lower shank of the hook, which loop is located relatively close to the curved forward shoulder portion of the hook.

From FIG. 2 it will be seen that I have displayed the hook 12 to a somewhat larger scale in order to emphasize the use of the novel downwardly directed loop or open ended eye 40, which is provided on the lower shank 28 of the hook in order to make possible the highly effective clustering of a series of hooks in the manner shown in FIG. 1 without constricting the free lateral movement of each hook.

With reference back to FIG. 1, it is to be understood that the lowermost hook 16 may be of identical configuration with hooks 12 and 14, that is, to utilize a downwardly directed loop adapted to be engaged by the eye of another hook. As an alternative, the lowermost hook 16 may have, as shown in FIG. 1, a lower shank in which no downwardly directed loop is provided. By the lowermost hook of the array having no downwardly directed loop, a somewhat larger lure or minnow may be utilized thereon, it being apparent that the downwardly directed loop serves in some instances to somewhat limit the effective length of the lure utilized on the lower shank of the hook.

With reference back to FIG. 2, it will be observed that the hook 12 has an eye 22 through which a fish line 24 may be passed, with it being important to note that the eye 22 is disposed at a right angle to the plane in which the upper shank 26 and the lower shank 28 reside. The upper shank portion 26 is substantially straight, extending at an angle downwardly and forwardly from the eye 22. The hook 12 also has the previously-mentioned lower, lure-receiving shank portion 28, with the lower shank portion being integral with the upper shank portion 26 of the hook. The upper shank portion 26 and lower shank portion 28 of the hook meet in a curved forward shoulder portion 30 of relatively small radius, such that an acute angle is formed. This arrangement enables the lower shank portion 28 to reside in a generally horizontal position when the hook is suspended from the eye 22 and a lure or minnow has been inserted upon the lower shank portion 28, with the head of the lure residing relatively close to the location of the curved forward shoulder portion 30.

The end of the lower shank portion 28 remote from the curved forward shoulder portion 30 of the hook has a curved, upturned portion 32 terminating in a point 34 having a barb 36 thereon. The point 34 of the upturned portion 32 is directed toward and in substantial alignment with the eye 22, with the point on the upturned portion being intended to protrude from a rear location on the respective lure; note FIG. 1.

It has already been mentioned that in accordance with this invention a relatively small, generally circular loop 40 is formed in the lower shank portion 28 of the hook 12. The preformed loop or open ended eye 40 is turned downwardly so as to be able to closely receive the eye of a like hook to be suspended below the lower shank portion. As is obvious from FIG. 1, the loop 40 of hook 12 forms the support for hook 14. In a like manner, the loop of hook 14 forms the support for hook 16.

The relatively small, generally circular loop 40 of each hook is disposed in a plane that includes the upper and lower shank portions. Of interest is the fact that, as shown in FIG. 2, the relatively small, generally circular loop 40 is closer to the curved forward shoulder portion 30 than to the upturned portion 32 that terminates in the point 34. Utilizing a vertically disposed line L drawn in FIG. 2 to represent the dropped-down location of the eye 22, it will be noted that the line L intercepts the lower shank portion 28 at a location closer to the curved forward shoulder portion 30 than to the upturned end 32 of the hook. I have defined the distance between the interception point of the vertical line L on the lower shank, and the curved forward shoulder portion 30 as distance D, with the location of the downwardly directed loop 40 being D/2 with respect to both the curved forward shoulder portion 30 and the interception point of the line L on the lower shank.

As was pointed out in my co-pending patent application Ser. No. 09/211,488 entitled "WEEDLESS HOOK AND LURE HAVING LURE INTERCHANGABILITY," the radius of curvature of the upturned portion 32 is preferably closely similar to the radius of curvature of the curved forward shoulder portion 30. The angle at the forward shoulder 30 between the upper shank portion and the lower shank portion is in the range of 40° to 70°.

As a consequence of the effective support location for each generally triangularly configured hook being disposed forward of the center of the lower shank portion, after a lure has been inserted on the lower shank portion with the head of the lure pointing forwardly, the lure will tend to weathervane. By this it is meant that the hook/lure will face forwardly when retrieved, and into a slight current when motionlessly suspended, while at the same time the body of the lure remains in a realistic, generally horizontally disposed attitude. The foregoing is true even when several of my novel hooks are clustered in a substantially vertical array as depicted in FIG. 1. I have found that the utilization of the downwardly turned loop 40 on the lower shank portion 28 of each hook does not in any manner interfere with the independent weathervaning of each of the hooks of the array.

Figure 2A:
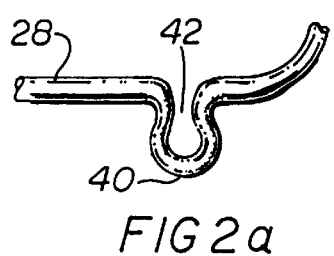
FIG. 2a is a fragmentary view to a still larger scale to illustrate the relatively narrow entrance portion of the preformed loop, through which entrance portion the eye of a like hook can be passed, with this view also making clear that a somewhat enlarged portion located below the relatively narrow entrance portion permits the eye of a hook suspended from the loop to move in a weathervaning manner in either direction out of the plane of the supporting hook.

In FIG. 2a I have shown a somewhat enlarged version of the down-turned loop 40, with it to be understood that the upper portion of the preformed loop 40 defines a relatively narrow entrance portion or throat 42, through which the eye of a like hook can be passed.

I may prefer for the entrance portion 42 to be slightly smaller than the wire diameter of the eye portion of the hook to be received therein, for this will decrease the likelihood of the hooks becoming undesirably separated. In the instance that such a relatively small entrance portion is used, it will be necessary for the fisherman to bias the upper and lower shank portions of the hook slightly apart in the vicinity of the curved forward shoulder portion, thus to cause the entrance portion 42 of the loop 40 to enlarge sufficiently to permit entry of the eye of another hook.

It is to be understood that the loop 40 has a somewhat enlarged portion at a location below the relatively narrow entrance portion 42, with the somewhat enlarged portion permitting the eye of a hook suspended from the loop to have a free lateral movement of 40° left and 40° right from the supporting hook. In other words, the use of the relatively narrow entrance portion 42 does not adversely affect the size or diameter of the loop 40, for it is desirable for the hook suspended from the enlarged lower portion of the loop to be able to weathervane either to the right or to the left for a considerable extent.

Figure 3:
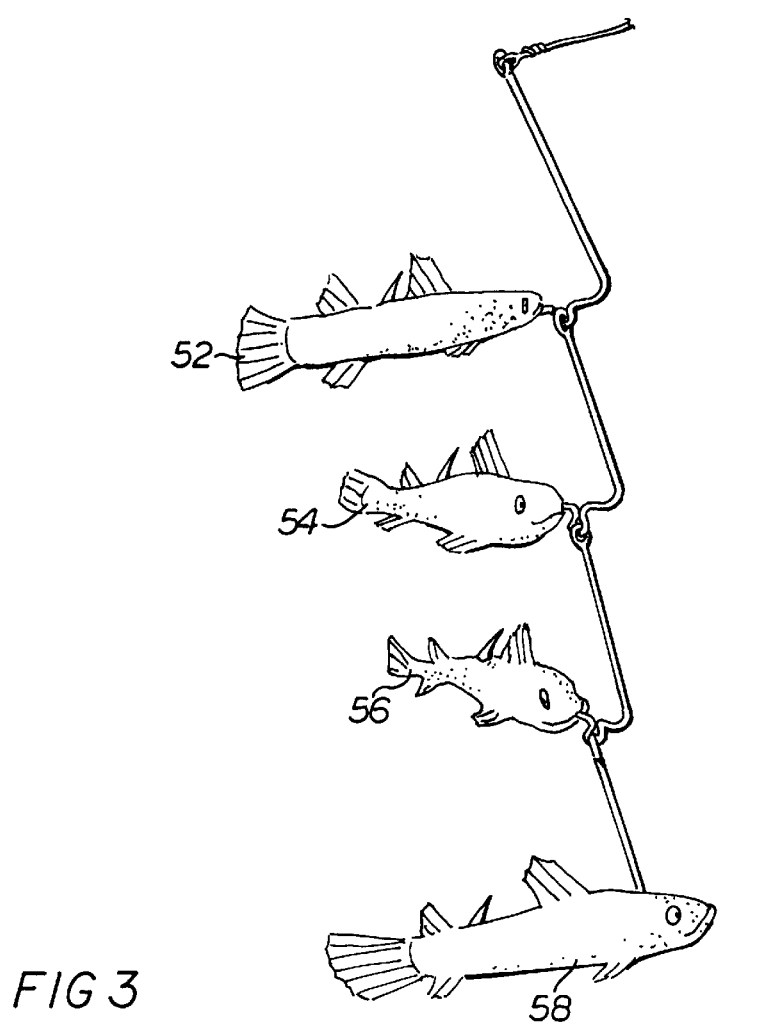
FIG. 3 is another showing of the utilization of a multiple hook array in accordance with this invention, with the array in this instance being constituted by four hook/lure elements, with it to be noted that each hook/lure combination can rotate or weathervane to some extent relative to the other hook/lure elements, instead of all of the hook/lure elements needing to remain in a common vertical plane.

With respect to FIG. 3 it will be noted that I am not limited to the three hook array depicted in FIG. 1, for four or more hooks may be utilized in a descending array as depicted in FIG. 3. As depicted in this figure, the novel, generally circular loop 40 formed in the lower shank portion of each hook is of sufficient diameter as to enable each hook/lure combination of the array to rotate or weathervane to some extent relative to the other hook/lure elements, instead of all of the hook/lure elements needing at all times to remain in a common vertical plane. FIG. 3 reveals that lure 54 is disposed at a different orientation than lure 52 thereabove, or lure 56 below, this exemplifying the highly advantageous weathervaning that may readily take place in the practice of my invention. It is nevertheless true, however, that the lures of my novel multiple hook arrangement may be regarded as continuing to face in the same general direction at all times, despite the weathervaning of the individual hook/lure entities of the array.

It is important to note that although I choose to refer to a series of the hook/lure entities as a substantially vertically disposed array, it is nevertheless true that because of the angularity of the forward shank portion of each hook and the forward placement of the loop 40, the lures are not disposed in a precisely aligned vertical array. As made clear from both FIG. 1 and FIG. 3, the lures instead reside in a relationship such that each lower lure is disposed somewhat forward of the lure immediately thereabove. This array is more natural than a closely aligned vertical array.

Figure 4:
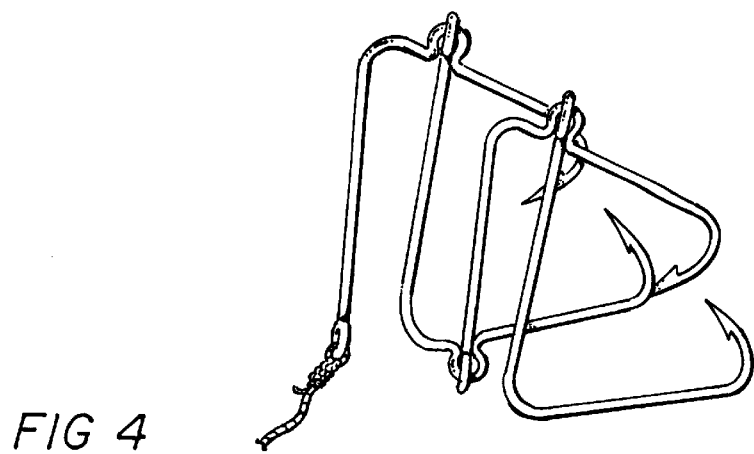
FIG. 4 is a view illustrating how in accordance with this invention it is readily possible for the fisherman to compact the multi-hook array into a configuration suitable for packaging or storage, without risking hook entanglement.

In FIG. 4 I illustrate how the basic configuration of my clustered hooks enables such to be compactly folded, providing a convenient arrangement suitable for packaging for sale or storage without risking entanglement of the hooks.

I claim:

1. A fishhook adapted to be used in an arrangement involving at least first and second hooks of an array of clustered hooks, with each hook of the array mounted for pivotal movement so as to be able to minify the chance of entanglement with weeds or trash, each said hook having an eye where it may be attached to a line or to another hook, each said hook also having an upper shank portion extending at an angle downwardly from said eye, and a lower, lure-receiving shank portion integral with said upper shank portion, said upper and lower shank portions of each hook meeting in a curved forward shoulder portion forming an acute angle, such that said lower shank portion is able to reside in a generally horizontal position when said hook is suspended from said eye, the end of said lower shank portion remote from said shoulder portion having an upturned portion terminating in a point, and a relatively small loop formed in said lower shank portion of said first hook, said loop having a relatively narrow entrance portion, through which entrance portion the eye of the second hook of like construction can be passed, said loop making it readily possible for the second hook to be suspended below said lower shank portion of said first hook, thus to enable the clustering of two or more hooks in a substantially vertically disposed array.

2. The fishhook adapted to be used in an arrangement involving at least first and second hooks of an array of clustered hooks as recited in claim 1, wherein a third hook of like construction is suspended from a relatively small loop formed in said lower shank portion of said second hook, said loop having a relatively narrow entrance portion, through which entrance portion the eye of the third hook of like construction can be passed.

3. The fishhook adapted to be used in an arrangement involving at least first and second hooks of an array of clustered hooks as recited in claim 1 in which said loop formed in said lower shank portion is closer to said curved forward shoulder portion than to said upturned portion terminating in a point.

4. The fishhook adapted to be used in an arrangement involving at least first and second hooks of an array of clustered hooks as recited in claim 3 in which the placement of said loop in the forward part of said lower shank portion causes each lower hook, when a plurality of hooks have been placed in a vertically clustered array, to be located slightly forward of the hook from which it is suspended.

5. The fishhook adapted to be used in an arrangement involving at least first and second hooks of an array of clustered hooks as recited in claim 1 in which said loop is disposed in a plane that includes said upper and lower shank portions.

\* \* \* \* \*